United States Patent [19]

Messick, Jr.

[11] Patent Number: 5,035,334

[45] Date of Patent: Jul. 30, 1991

[54] SHELVING APPARATUS HAVING A REPAIR COVER

[75] Inventor: Jerry C. Messick, Jr., Julian, N.C.

[73] Assignee: McCalla/Lackey Products Corporation, Hickory, N.C.

[21] Appl. No.: 458,594

[22] Filed: Oct. 30, 1989

Related U.S. Application Data

[63] Continuation of Ser. No. 323,256, Mar. 10, 1989, Pat. No. 4,890,374, which is a continuation of Ser. No. 248,303, Sep. 21, 1988, abandoned, which is a continuation of Ser. No. 20,168, Feb. 27, 1987, abandoned, which is a continuation of Ser. No. 767,439, Aug. 20, 1985, abandoned.

[51] Int. Cl.⁵ .............................................. A47F 5/00
[52] U.S. Cl. .................................. 211/134; 29/402.09
[58] Field of Search .......... 29/402.01, 402.09, 402.14, 29/402.15, 402.16, 402.17; 211/153, 189, 134, 186; 108/90, 157, 108, 107, 27; 312/140.3

[56] References Cited

U.S. PATENT DOCUMENTS 1,210,004 12/1916 Roe .
4,073,384 2/1978 Celeste .

Primary Examiner—Timothy V. Eley
Attorney, Agent, or Firm—Bailey & Hardaway

[57] ABSTRACT

Replacement covers for repairing merchandise shelving include a planar member of a size generally the same as the shelf to be covered, and at least one depending flange which covers the front edge of the merchandise shelf. In addition, the replacement cover includes securing means for retaining the shelf cover in place, which securing means may include resilient flanges which depend from an edge or edges of the planar member, inturned lips on such flanges, adhesive strips, or combinations of the above.

2 Claims, 4 Drawing Sheets

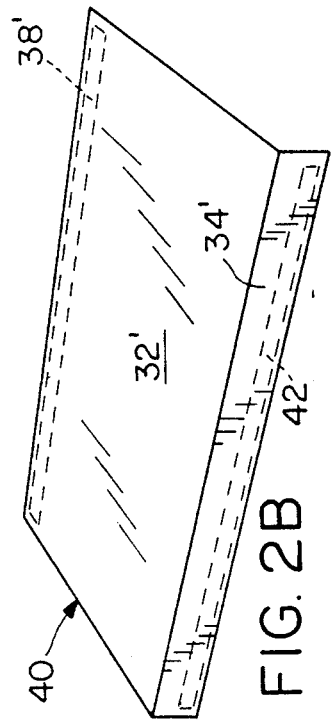
FIG. 2B
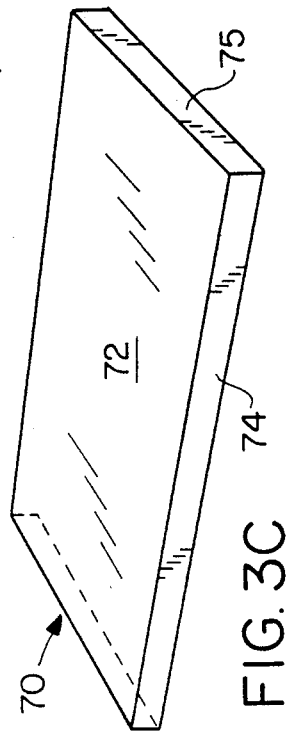
FIG. 3C
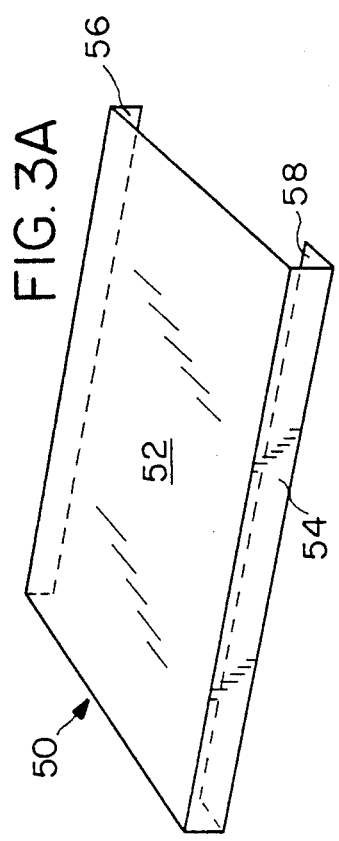
FIG. 3A
FIG. 3B
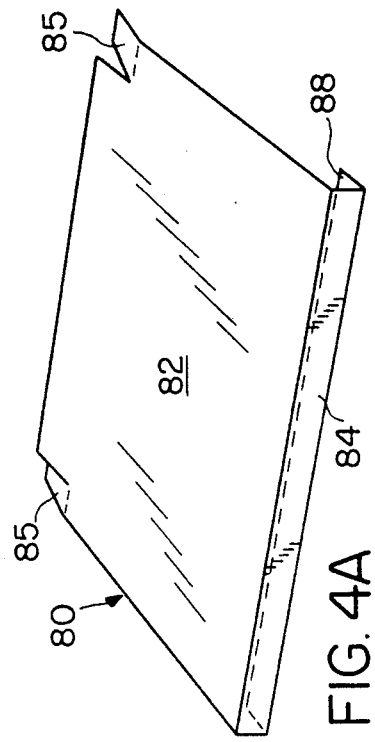
FIG. 4A
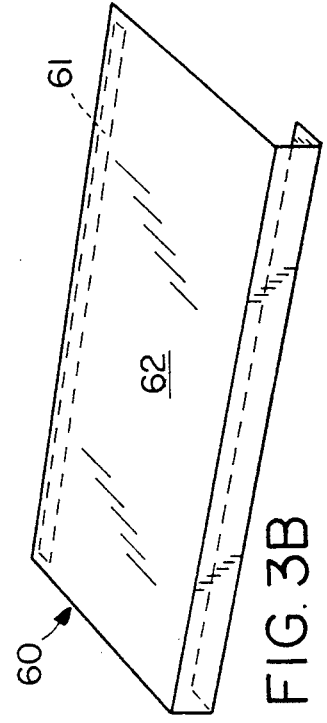
FIG. 4B

SHELVING APPARATUS HAVING A REPAIR COVER

Continuation of Ser. No. 07/323,256 filed Mar. 10, 1989, now U.S. Pat. No. 4,890,374 which in turn is a continuation of application Ser. No. 07/248,303 filed Sept. 21, 1988 now abandoned which in turn is a continuation of application Ser. No. 07/020,168 filed Feb. 27, 1987 now abandoned which in turn is a continuation of application Ser. No. 06/767,439 filed Aug. 20, 1985 now abandoned.

BACKGROUND AND SUMMARY OF THE PRESENT INVENTION

This invention relates to merchandise display systems or racks of a type which support a plurality of vertically spaced, horizontally extending shelves for displaying merchandise such as soft drinks. More specifically, this invention relates to replacement covers for repairing or refurbishing the damaged rear walls or shelves of such merchandise racks, which shelves are characterized by having a generally large flat surface and at least one adjacent, relatively narrow edge.

In recent years, the merchandising of articles for sale, such as soft drinks, food, drug or general purpose items, has developed to the point that retailers purchase free standing metallic shelving on which are displayed such products. Such free standing shelving generally falls into one of two types. The first type is the "gondola" type in which the rack includes a forwardly tilted, flat, or rearwardly inclined wedge-shape bottom shelf and an upwardly extending, structural rear wall from which one or more intermediate or upper shelves are suspended, such intermediate or upper shelves being supported only at or along the rear edge thereof by said rear wall. The other type of merchandise shelving which has achieved a substantial commercial position in the market is the "four-posted" display rack, which is a metal frame having four upstanding corner posts and no structural rear wall. A plurality of shelves are attached at each corner at spaced horizontal positions to provide a plurality of racks upon which merchandise is displayed.

Such gondola and four-posted displays, when new, are very attractive and present a most pleasing merchandising rack. However, due to extensive use and continued placement and removal of relatively heavy items (cartons of soft drinks) therefrom, the shelves become damaged, dented, and otherwise unsightly after a relatively short period of time. The retailer is then left in the position of either utilizing the unsightly display rack or replacing it which is fairly expensive.

Presently, there is no known system or product available for repairing or refurbishing damaged shelves in such racks. Even the replacement of damaged shelves is an expensive undertaking.

The present invention, on the other hand, is directed to a technique whereby merchandise displays can be quickly repaired or refurbished to look like new without replacement of individual shelves. Toward this end, the present invention employs replacement covers for repairing or refurbushing damaged rear walls or shelves of merchandise racks of the type described hereinabove. Such covers include a planar member having a generally large flat surface of substantially the same dimension as said wall or shelf to be repaired, one or more flanges depending downwardly from edges of the aforesaid planar member, and means for securing the planar member and/or flanges to the damaged shelf or wall. The means for securing the flanges and/or planar member may include resilient flanges which grip the underlying structural surfaces, inturned lips on such flanges which underlie the structural members beneath the cover, adhesive strips on the underneath side of the planar member or rear side of the flanges, or combinations of the above. Some types of covers are specifically designed and constructed to fit the shelves or rear walls of gondola type display racks and other types of covers are specifically designed and constructed to fit the shelves of four-posted displays.

It is therefore an object of the present invention to provide a technique for repairing or refurbishing the damaged rear walls or shelves of merchandise racks.

It is another object of the present invention to provide a technique for repairing or refurbishing racks of the type described wherein the repair or refurbishment is effected by the emplacement of cover members onto or over existing damaged shelves and walls and are secured thereto.

Other objects and a fuller understanding of the invention will become apparent from reviewing the following detailed description of a preferred embodiment along with the accompanying drawings in which:

FIGS. 2a and 2b are perspective views illustrating covers for the base wedge of the gondola type display;

FIGS. 3a–3c are perspective views illustrating covers for the base or shelves of the gondola type display rack;

FIGS. 4a and 4b are perspective views illustrating shelf covers for the gondola type display rack;

DETAILED DESCRIPTION OF A PREFERRED EMBODIMENT

Figure 1:
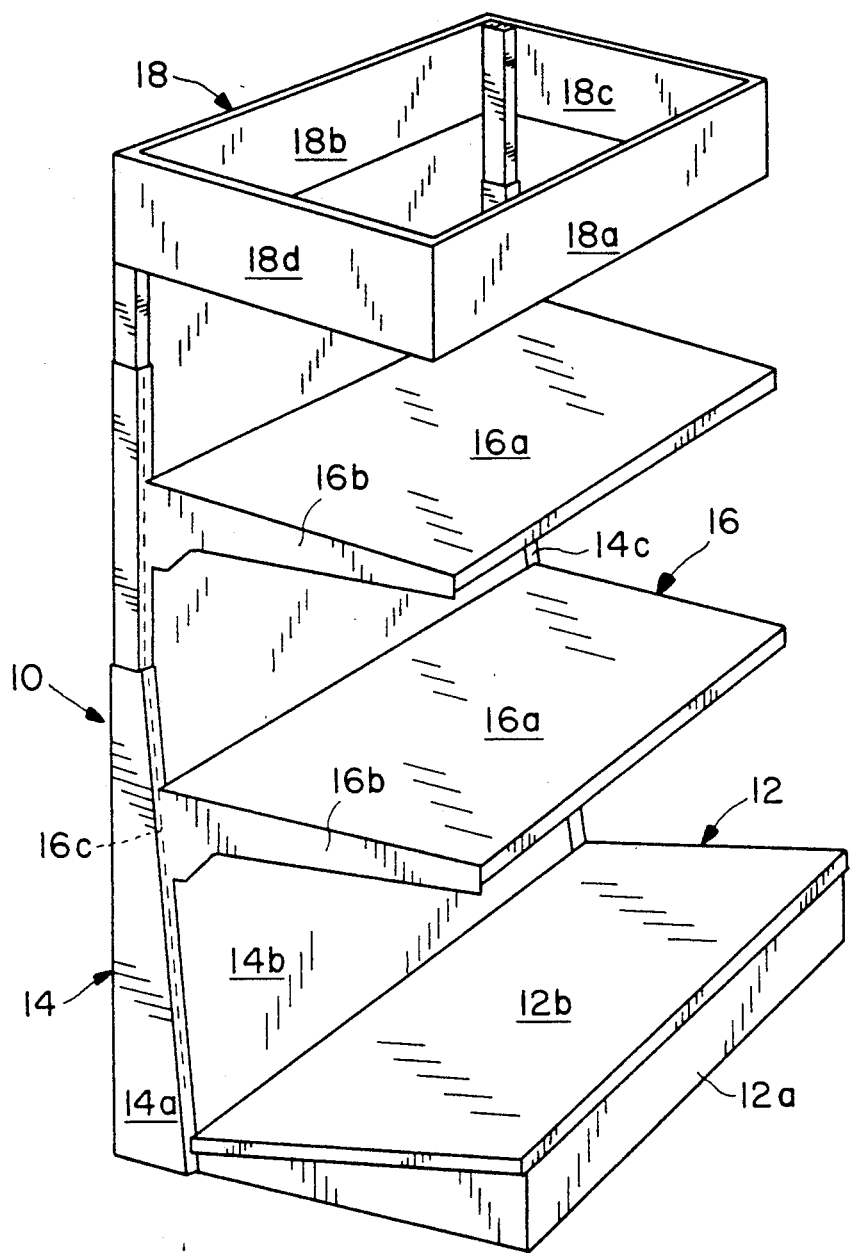
FIG. 1 is a perspective view illustrating a gondola type merchandise display.

Turning now to the drawings, there is illustrated in FIG. 1 an example of a conventional gondola type merchandise display rack 10. In general, gondola type racks include a base 12, a structural rear section 14 from which shelves 16 are suspended at or adjacent the rear edges thereof, and a top or signage member 18. The base 12 generally comprises a wedge-shaped supporting member 12a and a flat, rectangular base cover 12b. The wedge-shape support member 12a is generally either wooden or a metallic frame, and the base cover 12b is generally removable from the support member 12a.

The rear wall or section 14 includes side support members 14a and a rear panel or wall 14b. Generally, the rear wall includes an inclined lower portion and a generally vertical upper portion. A pair of attachment strips 14c extend up either edge of the rear portion 14b and include openings therein for mounting shelves 16 thereto in adjustable positions as desired.

The shelves 16 include a generally flat shelf portion 16a extending between a pair of opposed side brackets 16b. Each side bracket 16b includes a flange 16c at the rear edge thereof which protrudes outwardly and includes openings therein which are aligned with and provide a means for attaching shelf 16 to rear wall 14 by suitable conventional fasteners extending through the aforesaid aligned openings.

The signage member 18 includes a rectangular frame having front, rear and side panels 18a, 18b, 18c, and 18d. The signage member is attached to the upper end of side walls 14a in any suitable manner.

The embodiment illustrated in FIG. 1 is one type of gondola display unit which is presently commercially available to retailers. The gondola 10 may come in various lengths and/or heights, that shown being only representative. In any event, certain areas of the display during use are subjected to extreme wear. As a result, after a relatively short period of use, the display must either be discarded or refurbished. The areas of wear which must be taken into consideration are the relatively large rectangular shelves 16a, the rear wall 14b, and the base portion 12. In addition, the retailer may desire to change the signage member 18 or utilize a more generic signage, in which case the signage panels 18a–18d must be replaced or covered.

In FIGS. 2–6, there are illustrated examples of cover members in accordance with the present invention which are adapted for attachment to designated areas of the gondola display 10 illustrated in FIG. 1. For example, in FIGS. 2a and 2b there are illustrated wedge covers for covering the lower or wedge portion 12a of the gondola display rack 10. Toward this end, in FIG. 2a the wedge cover 30 includes a top plate 32 of approximately the same size and shape as the upper area of wedge member 12a. A front wall 34 depends angularly from the front edge of plate member 32 to cover the corresponding portion of wedge member 12a. The angle between upper member 32 and front wall 34 is substantially the same as the angle of the wedge (somewhat less than 90°). In order to maintain the wedge cover 30 in assembled position, in accordance with one embodiment of the invention, the front wall 34 is provided with a rearwardly extending lip 36 which is slipped underneath the front edge of wedge member 12a. In this embodiment, it should of course be recognized that the height of front wall 34 is substantially the same as the height of the front portion of the wedge member 12a. An adhesive or tape member 38 is provided along the underneath side of the top member 32 adjacent the rear edge thereof. When pressed into engagement with the surface of wedge member 12a, the rear edge is secured thereto. Thus, the cover member 30 is secured to the wedge member 12a.

Figure 2A:
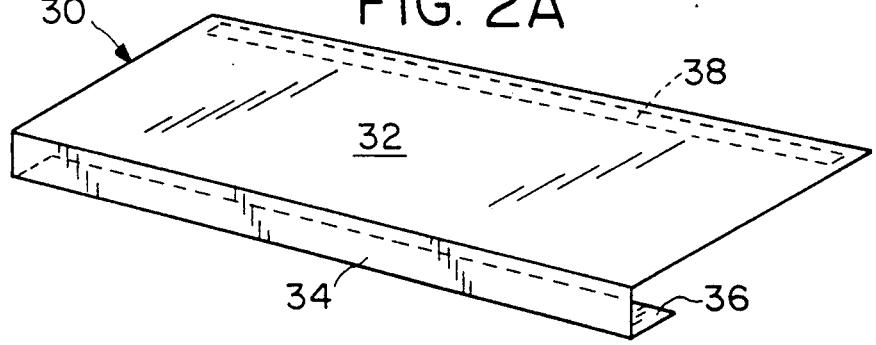

The cover 40 illustrated in FIG. 2b is very similar to the cover 30 of FIG. 2a with the exception that a second strip of adhesive or tape 42 replaces the rearwardly extending lip 36 of cover 30. Thus, both the rear edge of the top member 32' and the lower edge of the front wall 34' of cover member 40 are adhesively secured to the wedge member 12a. Cover members 30 and 40, as well as the other covers of FIGS. 2–6 and 8, may be of either metal or plastic as determined by the manufacturer or customer.

In FIG. 3a thru 3c there are illustrated three embodiments of a cover member for the top plate 12b of the base 12. This member may get more wear than any of the other areas mentioned, because generally the weight of merchandise stacked thereon is significantly greater than on the other shelves. In FIG. 3a the cover member 50 includes generally a planar member 52 with front and rear flanges 54, 56. The planar member 52 is substantially the same size in area as the top portion 12b of base 12, and the flanges 54, 56 are of a height substantially the same as the thickness of member 12b of base 12. The front flange 54 includes a rearwardly extending lip 58 which grips the underneath surface of top portion 12b and helps to retain the cover 50 in place. The resiliency of flange 56 bears against the rear edge of the underlying base 12 to secure the rear portion of the cover. The cover 60 is similar in all respects to cover 50 with the exception that a strip of double faced adhesive tape 61 beneath the planar member 52' adjacent the rear edge thereof replaces the rear flange 56 of FIG. 3a. In FIG. 3c, the base cover 70 includes a rectangular planar member 72 similar to planar members 52 and 62 of FIGS. 3a and 3b respectively, with the exception that the planar member 72 includes a front flange 74, rear flange (not shown) and a pair of side flanges 75 depending downwardly from all edges. The flanges 74, 75 are bent downwardly and form resilient walls that grip the edges of the underlying base member 12b. It should also be pointed out that the cover members illustrated in FIGS. 3a–3c may also be used as shelf covers in some situations.

Other examples of shelf covers are illustrated in FIGS. 4a and 4b. Again, in FIG. 4a the shelf member 80 includes a rectangular planar member 82 with a depending front flange or wall 84 and an inturned lip 88. Rear corner tabs 85 are bent downwardly to grip the rear edge of the underlying shelf or base portion.

In FIG. 4b, another shelf cover 90 is illustrated which includes the rectangular planar member 92 and either a rear flange 96 or a strip of double faced adhesive tape 98 along the rear underneath edge thereof. The difference here is that the front wall or edge 94 is of a much reduced height for use in situations where the gondola shelves include price channels or grooves along the front edge thereof. The front wall 94 of the member 90 includes a rearward extending hook or lip 95 which hooks into the corresponding groove in the price channel of the underlying shelf.

Figure 5A:
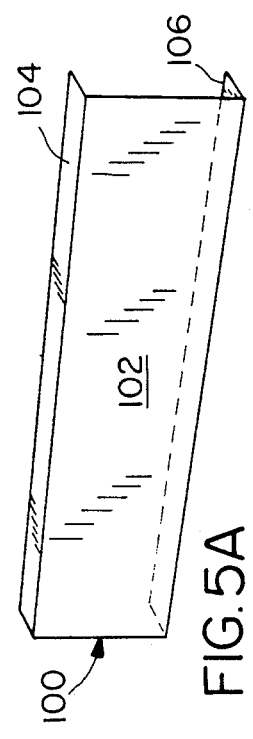
FIGS. 5a–5c are perspective views illustrating rear panels for the gondola type display rack.
Figure 5B:
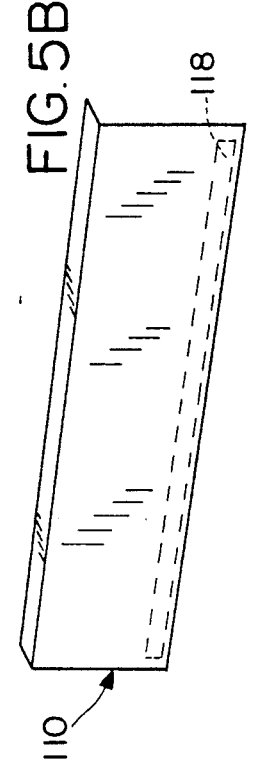
Figure 5C:
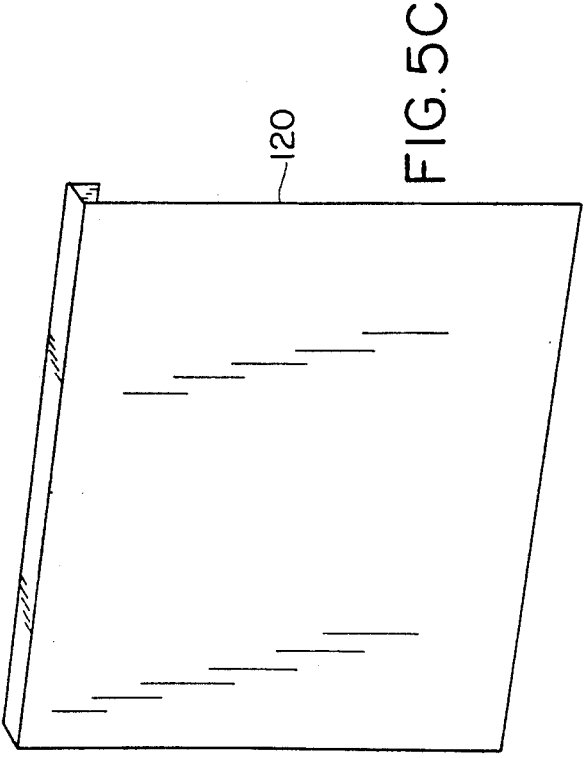

Turning now to FIGS. 5a–5c there are illustrated three examples of rear wall cover panels. In FIG. 5a the back panel 100 includes a planar member 102, a rearwardly extending upper edge 104, and a rearwardly extending lower edge 106 which mount the rear panel in surrounding relationship to the existing damaged rear panel. The planar member 102 should be so dimensioned as to be approximately the same size as the existing rear wall. In FIG. 5d the rear panel 110 is very similar to rear panel 100 with the exception that a strip of double faced tape 118 replaces the lower flange 106. In FIG. 5c, the rear panel cover 120 illustrated therein is similar to either panel cover 100 or 110, except being of a larger dimension to cover the entire or full rear panel of the gondola display.

Figure 6A:
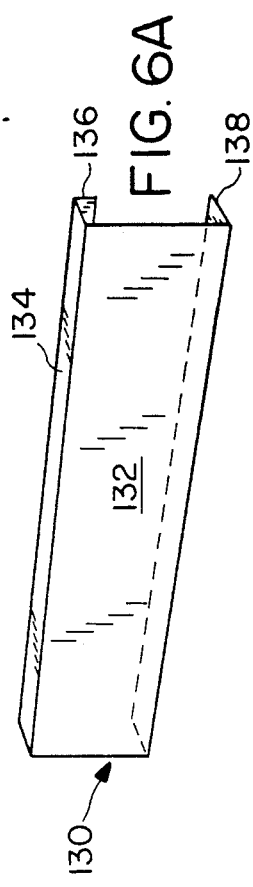
FIGS. 6a and 6b are perspective views illustrating covers for the top facing panel of either the gondola type racks or the four-posted display racks.
Figure 6B:
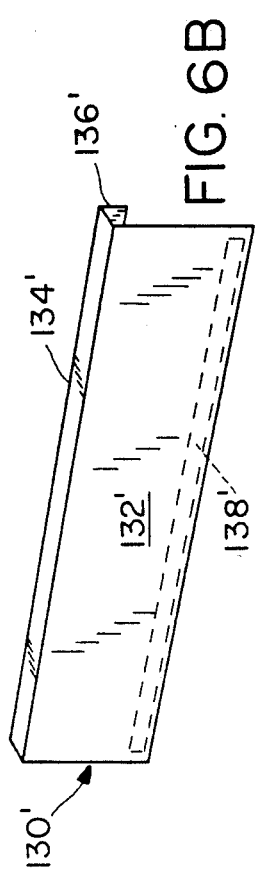
Figure 6C:
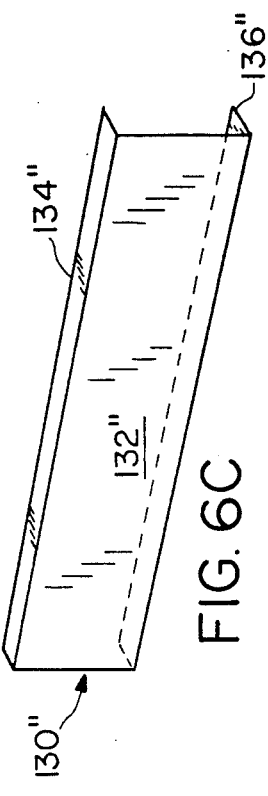

FIGS. 6a–6c are illustrative of covers for the signage member 18 of the display illustrated in FIG. 1. Again, such covers 130, 130' and 130" include a front panel 132 and a rearwardly extending top flange 134. The difference in these three embodiments resides in the manner in which the covers are secured to the signage panels 18a thru 18d. In the embodiment illustrated in FIG. 6a, the upper flange 134 is provided with a downturned lip 136 and the lower edge of the planar member 132 is provided with a rearwardly extending flange 138. The downturned lip 136 ensures that the cover member 130 does not slide forwardly or rearwardly, while the flange 138 maintains the cover 130 stationary in a vertical direction. In FIG. 6b, a strip of double faced tape 138' replaces the lower flange 138. In FIG. 6c the downturned lip 136 of FIG. 6a is removed and the resiliency of flanges 134" and 138" are relied upon to maintain the cover member 130' in place.

Figure 8A:
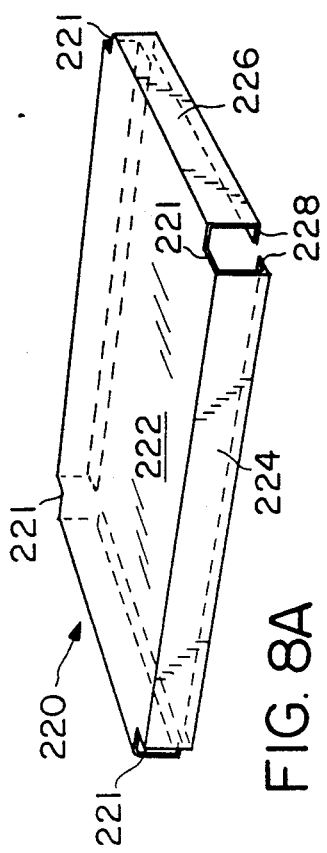
FIGS. 8a–8c are perspective views illustrating base or shelf covers for the four-posted display unit.
Figure 8B:
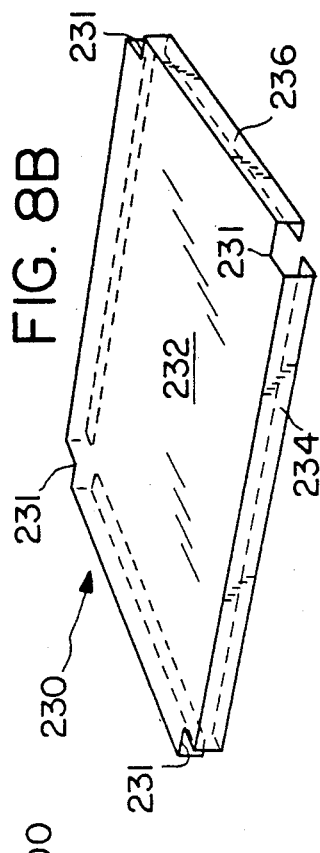
Figure 8C:
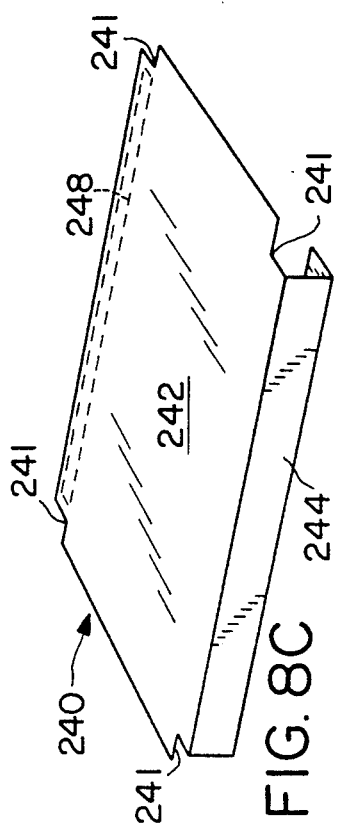
Figure 7:
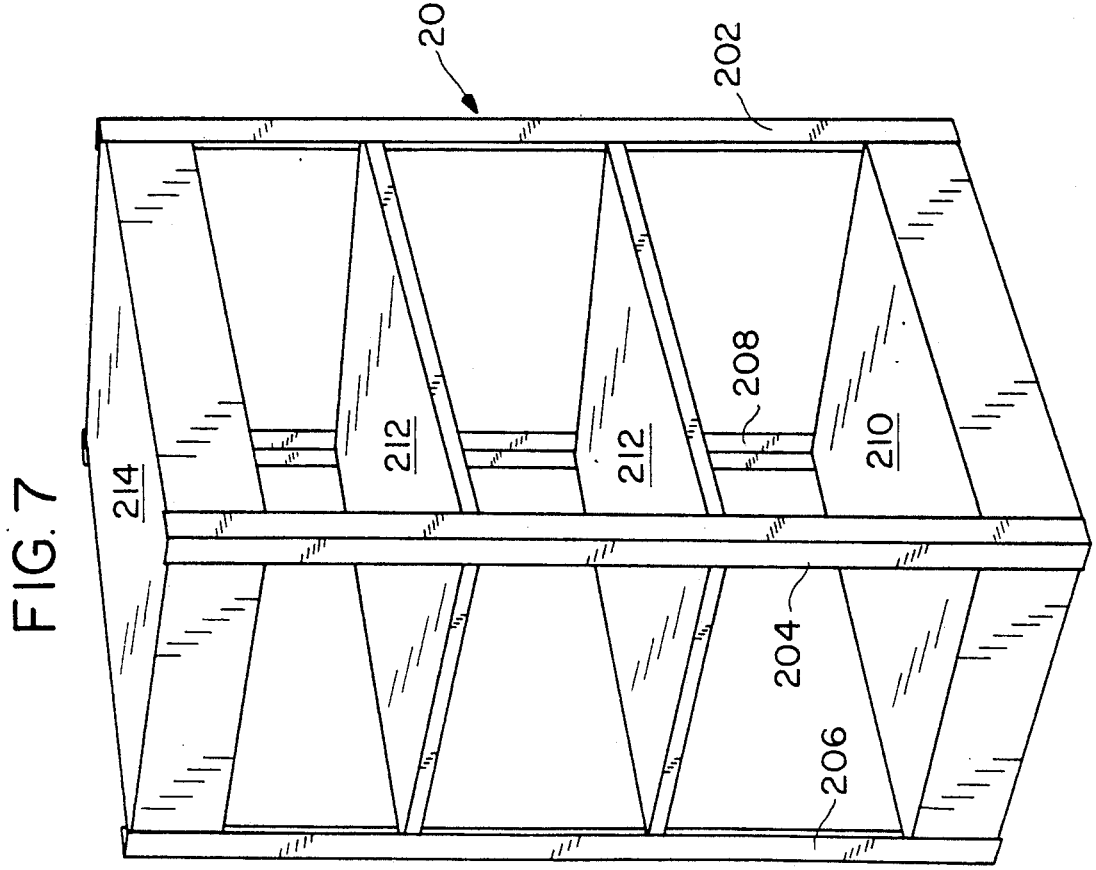
FIG. 7 is a perspective view illustrating a four-posted display rack according to the present invention.

Turning now to FIG. 7, there is illustrated the four-posted display rack 200, which is also in considerable use in retail establishments. This display rack 200 differs from the gondola type display 10 illustrated in FIG. 1, in that the shelves are secured at all four corners, rather than being suspended from the rear edge as in the gondola display. For this purpose, four upright metallic posts 202, 204, 206, and 208 join a base member 210, one or more shelves 212, and a signage member 214 in vertically spaced arrangement by connection to each to each corner thereof. Thus, in general, the shelf or base covers for such members must differ from those described above in that cut-outs must be provided at the corners thereof. As illustrated in FIGS. 8a–8c, there are shown examples of covers or cover members which function satisfactorily on the four-posted display 200 of FIG. 7.

In FIG. 8a, there is illustrated the base cover member 220 which includes a planar member 222 and 35 depending side flanges 224 and end flanges 226 extending generally downwardly therefrom. Each of the side and end flanges 224, 226 include inturned lips 228. The resiliency of the flanges 224, 226 permit the cover members 220 to snap down over the existing damaged base 210 with the planar member 220 covering the damaged base and the flanges 224, 226 covering the side and end walls thereof. The embodiment illustrated in FIG. 8a includes side and end flanges 224, 226 of a height intended for use in covering the base member 210, while the cover member 230 illustrated in FIG. 8b includes side and end flanges 234, 236 of a height suitable for covering shelf members 212. Each of cover members 220 and 230 include notches or cut-outs 221 and 231 respectively in the corners thereof to provide clearance for upstanding posts 202, 204, 206 and 208.

In the embodiment illustrated in FIG. 8c, the cover member 240 includes a planar member 242 which is notched at each corner 241 as described hereinabove, and a front wall or flange 244. In this embodiment, the end walls or flanges are omitted, and a strip of double faced tape 248 is provided on the underneath side of planar member 242 along the rear edge thereof to secure the planar member to the damaged shelf therebeneath.

There has thus been described in detail hereinabove a description of the present invention. Obviously changes and modifications might be made thereto without departing from the scope of the invention which is set forth in the accompanying claims.

What is claimed is:

1. A shelving apparatus comprising:
   a shelf having a generally flat planar surface for the placement of goods thereon said flat surface being worn and marred due to continued use;
   said shelf having a narrow edge adjacent said flat surface, said edge being worn and unsightly from use;
   a cover for said shelf to give the shelf the appearance of an unworn shelf comprising a planar member having a front edge, rear edge, and side edges, and a generally large flat surface of substantially the same dimension as said large flat surface of said shelf;
   said front, rear and side edges of said planar member each including a depending flange, wherein cut-outs are provided at each corner of said planar member, and wherein all four flanges are formed of resilient material for securing to said underlying shelf;
   means for attaching said front and rear edges of said planar member to said marred shelf.

2. A shelving apparatus comprising;
   a shelf having a generally flat surface for the placement of goods thereon said flat surface being worn and marred due to continued use;
   said shelf having a narrow edge adjacent said flat surface, said edge being worn and unsightly from use;
   a dover for said shelf to give the shelf the appearance of an unworn shelf comprising a planar member having a front edge, rear edge, and side edges, and a generally large flat surface of substantially the same dimension as said large flat surface of said shelf;
   a front flange depending downwardly from said front end to cover said narrow adjacent edge;
   a rearwardly directed lip extending from the lower edge of said front flange substantially parallel to said shelf and said cover; and
   means for attaching said rearwardly directed lip, said front flange and rear edge of said planar member to said marred shelf, said means for attaching said rear edge of said planar member including an adhesive strip secured to the underside of said planar member adjacent the rear edge thereof, said adhesive strip adhering to the surface of said shelf or wall to hold said planar member in place.

* * * * *